United States Patent
Babu et al.

(10) Patent No.: US 8,066,490 B2
(45) Date of Patent: Nov. 29, 2011

(54) WIND TURBINE ROTOR BLADE

(75) Inventors: Achuthan Babu, Bangalore (IN); Saravakota Sambamurty, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/642,891

(22) Filed: Dec. 21, 2009

(65) Prior Publication Data

US 2011/0135490 A1 Jun. 9, 2011

(51) Int. Cl.
*F03D 1/06* (2006.01)

(52) U.S. Cl. ........................................ 416/209; 416/238

(58) Field of Classification Search ................... 416/209, 416/229 R, 230, 234, 238
See application file for complete search history.

(56) References Cited

U.S. PATENT DOCUMENTS

| | | | |
|---|---|---|---|
| 4,260,332 A * | 4/1981 | Weingart et al. | 416/226 |
| 4,412,784 A | 11/1983 | Wackerle et al. | |
| 4,915,590 A | 4/1990 | Eckland et al. | |
| 5,106,029 A | 4/1992 | Ehrola | |
| 5,660,527 A | 8/1997 | Deering et al. | |
| H2057 H | 1/2003 | Veers | |
| 7,351,040 B2 | 4/2008 | Livingston et al. | |
| 7,364,407 B2 | 4/2008 | Grabau et al. | |
| 7,438,533 B2 * | 10/2008 | Eyb et al. | 416/230 |
| 7,517,194 B2 * | 4/2009 | Doorenspleet et al. | 416/204 R |
| 7,625,185 B2 | 12/2009 | Wobben | |
| 2005/0106029 A1 | 5/2005 | Kildegaard | |
| 2005/0180854 A1 | 8/2005 | Grabau et al. | |
| 2006/0067827 A1 | 3/2006 | Moroz | |
| 2007/0025856 A1 | 2/2007 | Moroz | |
| 2007/0140863 A1 | 6/2007 | Eyb et al. | |
| 2009/0092493 A1 | 4/2009 | Violette | |
| 2009/0148291 A1 | 6/2009 | Gerber et al. | |
| 2009/0232656 A1 | 9/2009 | Grabau | |

FOREIGN PATENT DOCUMENTS

| | | |
|---|---|---|
| WO | WO0142647 A3 | 6/2001 |
| WO | WO03082551 A1 | 10/2003 |
| WO | WO2004110862 A1 | 12/2004 |
| WO | WO2006070171 A1 | 7/2006 |

OTHER PUBLICATIONS

International Search Report and Written Opinion for corresponding PCT Application No. PCT/IN10/00839, May 2, 2011.

* cited by examiner

*Primary Examiner* — Nathaniel Wiehe
(74) *Attorney, Agent, or Firm* — Global Patent Operation; Douglas D. Zhang

(57) ABSTRACT

A rotor blade for a wind turbine is disclosed. The rotor blade includes a flange section configured to connect the rotor blade to a rotor hub; and an airfoil section extending outward from the flange section. The flange section is comprised of a carbon reinforced polymer.

11 Claims, 5 Drawing Sheets

WIND TURBINE ROTOR BLADE

BACKGROUND OF THE INVENTION

The present disclosure generally relates to wind turbines, and, more particularly, to a flange section for connecting a rotor blade to a hub of a wind turbine.

Wind turbines have received increased attention as an environmentally safe and relatively inexpensive alternative energy source. With this growing interest, considerable efforts have been made to develop wind turbines that are reliable and efficient.

Generally, a wind turbine includes a rotor comprised of a hub and a plurality of blades mounted on the hub. The rotor is usually coupled to a generator through a gearbox. The generator is mounted within a housing or nacelle, which is positioned on top of a tubular tower. Utility grade wind turbines (i.e., wind turbines designed to provide electrical power to a utility grid) can have large rotors (e.g., thirty or more meters in diameter). Blades of such a rotor transform wind energy into a rotational torque or force that drives the generator. The rotor is supported by the tower through a bearing that includes a fixed portion coupled to a rotatable portion.

Apart from the aerodynamic design of a wind turbine rotor blade, the quality and weight of the rotor blade are essentially determined by the design of the blade root section. This blade root section connects to the rotor hub at what is referred to as the blade root joint. The blade root joint is a critical aspect of wind turbine rotor blades, as it transfers all of the aerodynamic force from the rotor blade to the remaining part of the wind turbine unit.

One difficult aspect of the design of the blade connection to the rotor hub is the load transfer from the fiber composite structure of the rotor blade to the metal structure of the rotor hub. Such a load transfer is difficult in principle due to the substantially different properties of the materials involved. Furthermore, the rotor loads are concentrated at the blade root portion, and the rotor hub and the loads exhibit a highly dynamic load spectrum.

The root section of the rotor blade is generally thicker, when compared to other blade sections, to accommodate high loads. In conventional wind turbines, the root section of the rotor blades is made of glass fiber reinforced polymers ("GFRP") with T-bolt joints. The length of the root section of the rotor blade made of glass fiber reinforced polymers will typically be in the range of approximately 1.2 to 1.4 meters. The glass fiber reinforced polymer is generally oriented at 0 and +/−45 degrees relative to a longitudinal axis of the rotor blade in order to carry bending and shear loads. The blade root joint is typically evaluated by the fatigue life of the joint bolts.

It is expected that the electricity from clean wind resources will require more and bigger wind turbines. As the size of the rotor blade is increased, the design of the root section becomes more and more important with respect to the strength and weight of the materials used.

Accordingly, it would be desirable to provide a root section for a rotor blade that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to a rotor blade for a wind turbine. A rotor blade for a wind turbine is disclosed. The rotor blade includes a flange section configured to connect the rotor blade to a rotor hub; and an airfoil section extending outward from the flange section. The flange section is comprised of a carbon reinforced polymer.

Another aspect of the disclosed embodiments relates to a blade root for a rotor blade for a wind turbine. The blade root includes a first end for connecting to a rotor hub; a second end from which an airfoil section of the rotor blade extends outward; and a tapered portion between the first end and the second end.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
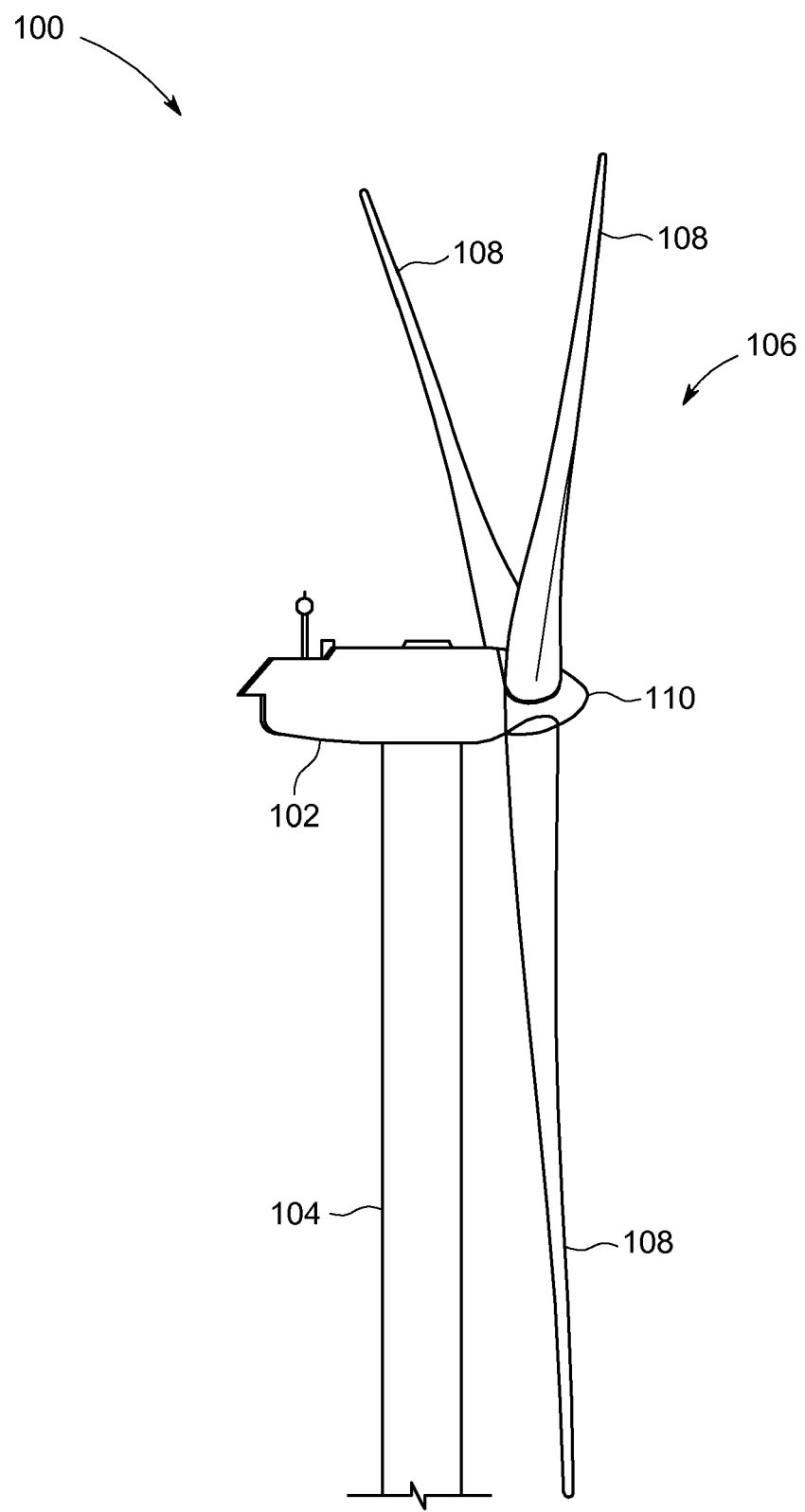
FIG. 1 shows a side elevational view of a wind turbine according to an embodiment of the present disclosure.

FIG. 1 illustrates an exemplary wind turbine 100 incorporating aspects of the disclosed embodiments. The aspects of the disclosed embodiments are generally directed to providing a flange section or blade root for a rotor blade, which blade root incorporates a carbon reinforced polymer, thereby allowing for reductions in a size of the blade root diameter and the number of joint bolts compared to conventional blade roots.

As shown in FIG. 1, the wind turbine 100 includes a nacelle 102 and a rotor 106. Nacelle 102 is a housing that is mounted atop a tower 104. The nacelle 102 includes a generator (not shown) disposed therewithin. The height of the tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. The rotor 106 includes one or more turbine blades 108 attached to a rotatable hub 110. In this exemplary embodiment, the wind turbine 100 includes three turbine blades 108.

Figure 2:
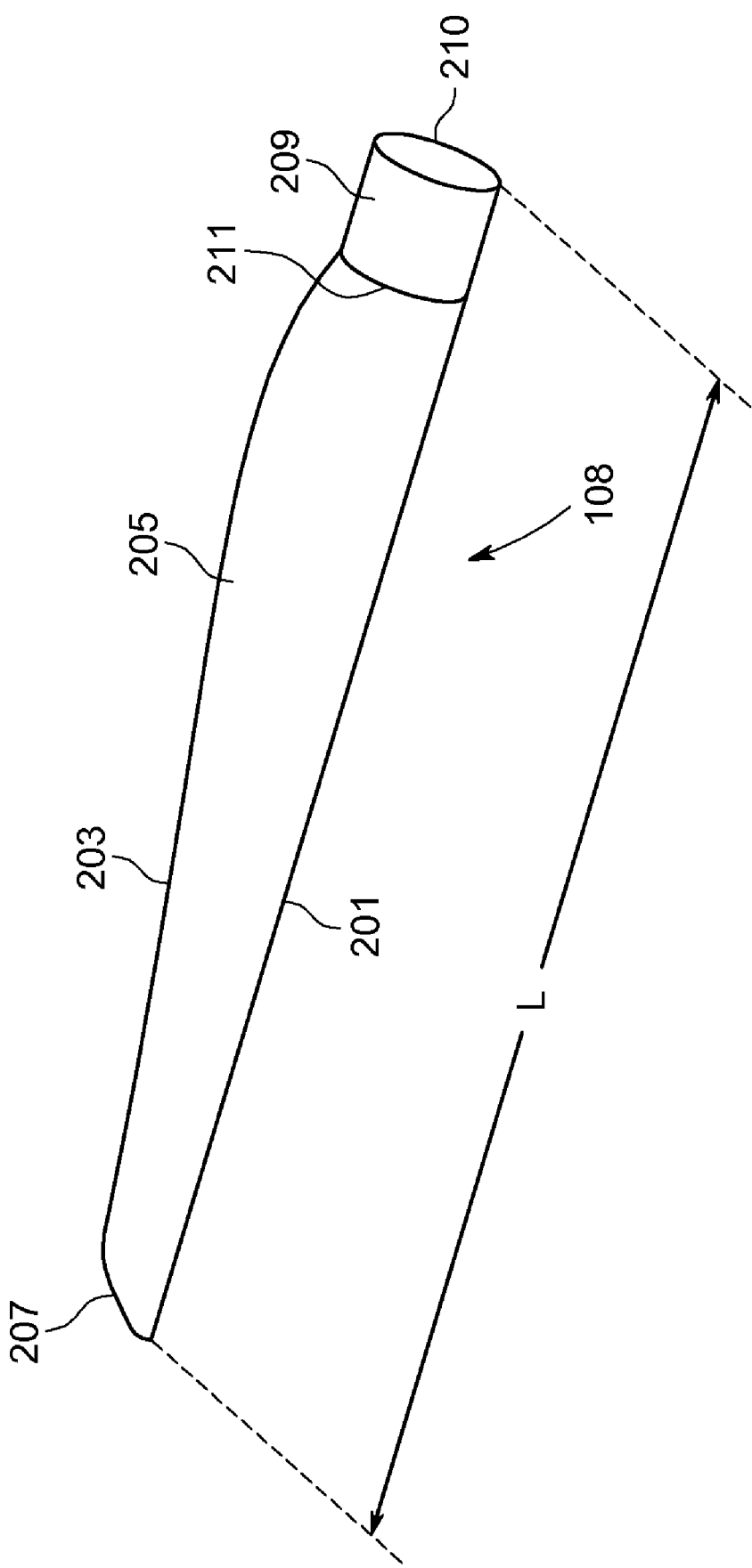
FIG. 2 shows a top perspective view of a wind turbine blade according to an embodiment of the present disclosure.

FIG. 2 illustrates an exemplary turbine blade 108 according to an embodiment of the present disclosure. The turbine blade 108 includes an airfoil section 205 and a blade root or root portion 209. The airfoil section 205 connects to (in a known manner) and extends outward from the blade root 209. The airfoil section 205 includes a leading edge 201, a trailing edge 203, a tip 207, and a root edge 211. The turbine blade 208 has a length L between the inner edge 210 of the blade root 209 and the tip 207. The blade root 209, also referred to as a flange section, is connectable to the hub 110 of the wind turbine 100 shown in FIG. 1.

Figure 3:
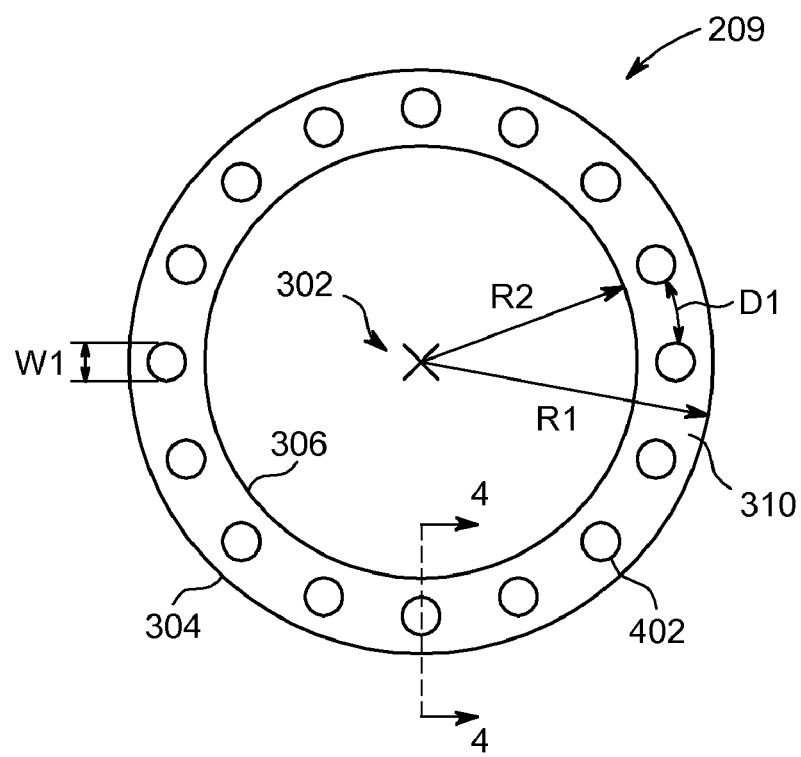
FIG. 3 is a view of a flange section of the wind turbine blade of FIG. 2.

FIG. 3 illustrates the flange section 209 of the rotor blade 108 when seen from a proximal end (i.e., in the direction from the inner edge 210 of the blade root end to the tip 207 of the rotor blade 108). The flange section 209 has an essentially circular cross-section, where an outer sidewall surface 304 is spaced from a longitudinal axis 302 of the rotor blade 108 by a radius R1. The flange section 209 also has an inner sidewall surface 306 spaced from the longitudinal axis 302 of the rotor blade 108 by a radius R2. The wall thickness 310 of the flange section 209 is equivalent to the difference between R1 and R2.

The flange section 209 also includes a number of longitudinal bores 402. The longitudinal bores 402 typically each have a diameter W1 and are spaced apart by an arcuate distance D1 along a circumferential direction of the flange section 209. When the rotor blade 108 is mounted to the hub 110, bolts are inserted into the longitudinal bores 402 to form a T-bolt connection.

Figure 4:
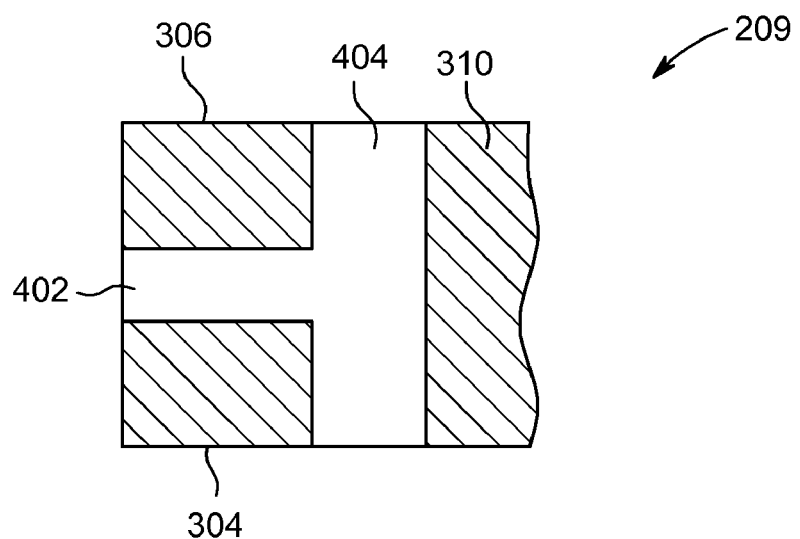
FIG. 4 is a partial, cross-sectional view of a T-bolt connection in the flange section along line 4-4 in FIG. 3.

FIG. 4 is a partial longitudinal cross-sectional view of the T-bolt connection in the flange section 209 taken along the line 4-4 in FIG. 3. Longitudinal bores 402 are located preferably in the middle region between outer sidewall surface 304 and inner sidewall surface 306 of rotor blade 108. A radial bore 404 is provided between the sidewall surfaces 304 and 306 for each longitudinal bore 402. When rotor blade 108 is mounted to the rotor hub 110, cross-bolts are inserted into radial bores 404 to form the T-bolt connection with bolts inserted into longitudinal bores 402. The flange section 209 according to the disclosed embodiments incorporates, or is formed of, a carbon fiber reinforced polymer.

Figure 5:
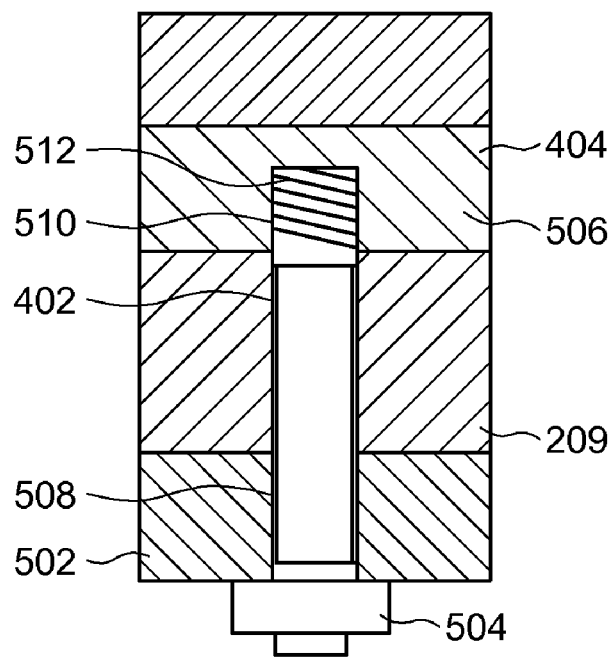
FIG. 5 is a cross-sectional view of a T-bolt connection between the blade root and a flange section of a rotor hub.

FIG. 5 is a cross-sectional view of a cross-bolt connection formed between the flange section 209 of the rotor blade 108 and a flange 502 of the rotor hub 110. A cross-bolt 506 is shown inserted into radial bore 404. Cross-bolt 506 has a female thread section 512 which is aligned with longitudinal bore 402. The flange 502 of rotor hub 110 abuts against the inner edge 210 of flange section 209. Flange 502 has a through-hole 508 fitting with longitudinal bore 402 of flange section 209. The through-hole 508 and longitudinal bore 402 are aligned with each other so that a bolt 504 can be inserted into the through-hole 508 and longitudinal bore 402. Bolt 504 includes a male thread 510 fitting with the female thread of cross-bolt 506. Bolt 504 is fixed to cross-bolt 506 via screwed fastening so that a cross-bolt connection is established. Rotor blade 108 is thus fixed to rotor hub 110.

In the above described bolt-connection arrangement, flange 502 of rotor hub 110, cross-bolt 506 and longitudinal bolt 504 are usually fabricated from steel. However, flange section 209 is usually fabricated from a carbon reinforced polymer.

Figure 6:
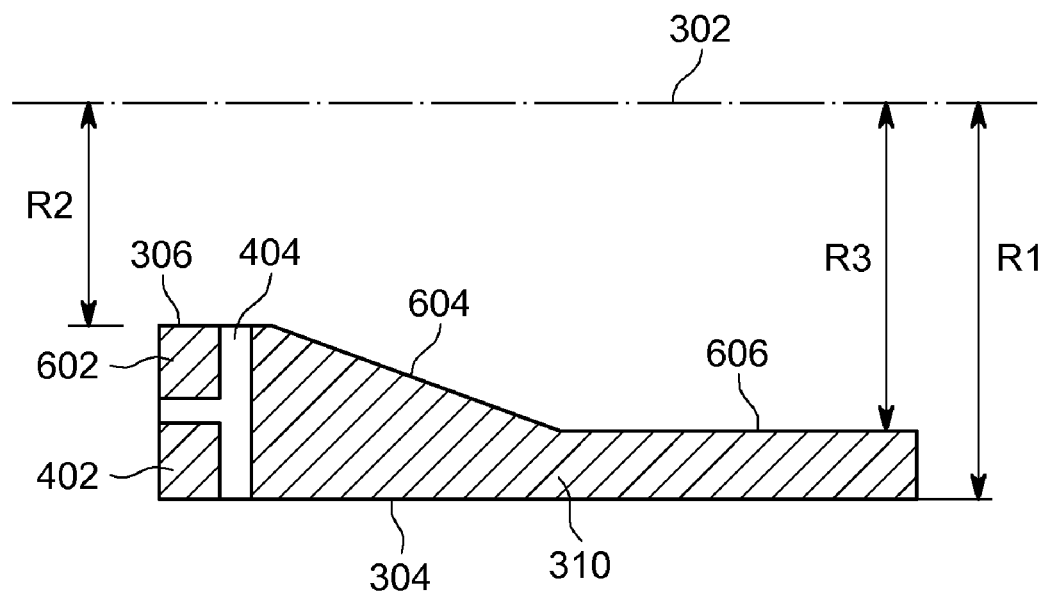
FIG. 6 is a longitudinal cross-sectional view of the sidewall of the flange section of a rotor blade shown in FIG. 3; and, FIG. 7 shows a GFRP blade root and the blade root incorporating aspects of the disclosed embodiments in different views.

FIG. 6 illustrates a longitudinal cross-sectional view of the sidewall of one embodiment of a flange section 209. The flange section 209 includes the longitudinal bore 402 and the radial bore 404. In the embodiment shown in FIG. 6, the wall of the flange section 209 has three sections—a root-end section 602 with a substantially constant wall thickness, a middle section 604 with a diminishing wall thickness, and a blade-side section 606 with a substantially constant wall thickness.

The inner radius R2 of FIG. 3 is smaller at the root-end section 602 compared to R3 at the blade-side section 606. The middle section 604 connects the root-end section 602 and the blade-side section 606. Within the middle section 604, the inner radius R2 at the root-end section 602 increases to inner radius R3 at the blade-side section 606 to form a generally smooth transition between the two sections. Typically, the inner radius from R2 to R3 increases linearly along the longitudinal length of the middle section 604 so that the wall thickness 310 of the flange section 209 varies linearly within the middle section 604, from a larger, substantially constant thickness at the root-end section 602 to a smaller, substantially constant thickness at blade-side section 606. In the embodiment shown, the outer radius R1 remains substantially constant over the longitudinal length of the flange section 209. In alternate embodiments, the outer radius R1 can vary.

The carbon fiber reinforced polymer provides a high stiffness to weight ratio in comparison to a glass fiber reinforced polymer. By substituting a carbon fiber reinforced polymer (CFRP) in place of glass fiber reinforced polymer in the blade root 209, the number of joint bolts can be decreased for the same root diameter. Additionally, by using a carbon fiber reinforced polymer blade root, the diameter of the blade root 209 can be reduced, which correspondingly permits a reduction in a size of the pitch bearing and hub 110.

Figure 7:
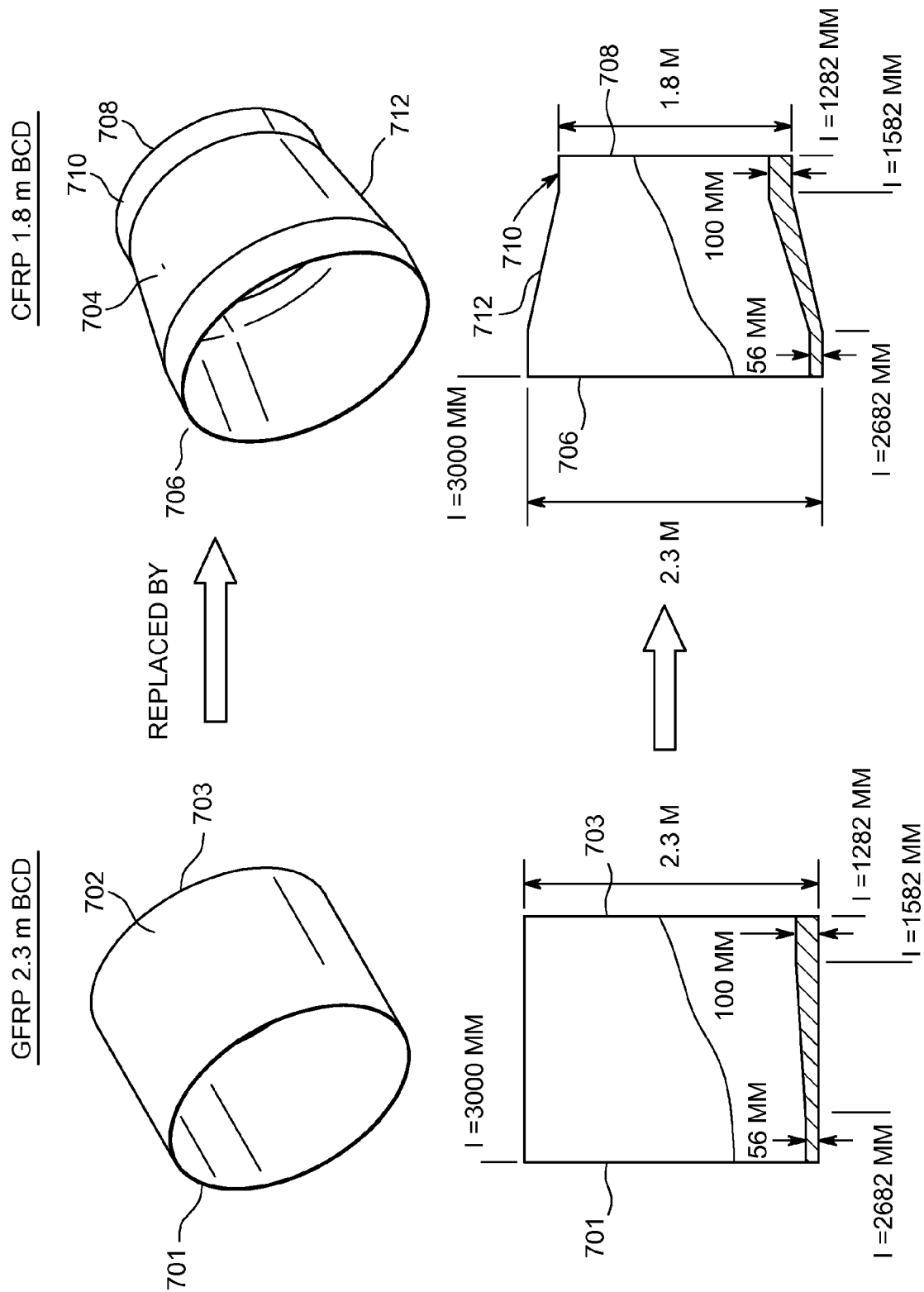

As shown in FIG. 7, blade root 702 has a relatively constant outer diameter of 2.3 meters from blade end 701 to bolt circle diameter end 703. In the study, the glass fiber reinforced polymer of a conventional blade root with a 2.3 bolt circle diameter (BCD) is replaced with a carbon reinforced polymer to form the blade root of the same size and configuration. The rotor blade is loaded with flap loads along a length of the blade. For the flap loads, it is found that the root blade strains on the carbon fiber reinforced polymer blade root are within allowable strain limits. The fatigue reserve factor for the joint bolts in the carbon reinforced polymer blade root has been found to be approximately twice that of the joint bolts in the conventional glass fiber reinforced polymer blade root described above. The design option with the increase in reserve margin for the carbon fiber reinforced polymer blade root therefore allows for a reduction in the size of the blade root and/or reducing the number of bolt joints.

As shown in FIG. 7, in one embodiment, the 2.3 meter bolt circle diameter glass fiber reinforced polymer blade root 702 is replaced with carbon reinforced polymer blade root 704 that has a 2.3 meter blade end or air foil end 706 and 1.8 meter diameter bolt circle diameter 708. Although for purposes of the description herein, the dimensions of the diameters of the blade end 706 and bolt circle end 708 will be stated as 2.3 meters and 1.8 meters, respectively, in alternate embodiments the diameter of the blade end 706 can vary between approximately 1.8 and 2.3 meters, while the diameter of the bolt circle end 708 can vary between approximately 1.5 to 1.85 meters. A ratio of the diameters of bolt circle end 708 to blade end 706 is in the range of approximately 0.75 to 1.0.

As shown in FIG. 7, the carbon reinforced polymer blade root 704 includes a tapered portion 712 between the bolt circle end 708 and the air foil end 706. In one embodiment, the blade root 704 has a length of 1718 mm. In one embodiment, an additional 100 kilograms (about 3-5% by weight) of glass material is added in a transition portion 710 between the bolt circle end 708 and the tapered portion 712 to provide better bending and shear transfer. About 3-5% by weight of unidirectional fiber is added to the tapered portion 712. As shown in FIG. 7, a distance between the bolt circle end 708 and the distal end of the transition portion 710 is 300 mm. In this example, the joint bolts in the carbon reinforced polymer blade root 704 have a fatigue reserve factor that is greater than the required reserve factor. The fatigue reserve factor is preferably in the range from 1.00 to 1.60. Thus, by using a carbon reinforced fiber polymer blade root in a 2.5 megawatt turbine, the diameter of the bolt circle end 708 can be reduced from 2.3 meters to a diameter varying between 1.5 and 1.85 meters. This results in a smaller diameter pitch bearing and reduced hub size, which generates realized cost savings. One estimate places the cost of a 2.5 megawatt turbine with a 1.8 meter bolt circle diameter carbon reinforced fiber blade root to between the cost of a 1.5 megawatt and 2.5 megawatt turbine with a 2.3 meter bolt circle diameter blade root. The smaller sizes and weights that are realized with the carbon reinforced polymer blade root 704 should also reduce the logistical costs related to the turbine.

Referring to FIG. 3, the wall thickness 310 of the blade root 209 is substantially constant along the circumference of the blade root 209. In one embodiment, the wall thickness 310 of the blade root 209 is 100 mm which is substantially constant along the length of the blade root 209. In other embodiments, such as the one shown in FIG. 7 where the carbon reinforced polymer blade root 704 tapers from the 1.8 meter bolt circle diameter at end 708 to a 2.3 meter diameter at end 706, the wall thickness 310 can vary. For example, referring to FIGS. 2 and 7, in one embodiment, where the blade 108 is a 48.7 meter blade, the length l=50,000 mm refers to the length from a hub center to the blade tip 207, including a hub length of 1.282 meters. In this example, length l=0 at the hub center and l=1282 mm at the blade root end 210. For the 2.3 meter GFRP blade root 702 shown in FIG. 7, the wall thickness variation along the length of the blade root 702 is approximately as follows:

| l (mm) | Thickness (mm) |
|---|---|
| 1282 | 100 |
| 1582 | 100 |
| 2682 | 56 |
| 3000 | 56 |

The wall thickness between l=1282 mm and 1582 mm is approximately 100 mm (i.e., this portion has a substantially constant wall thickness). The wall thickness variation is generally linear between l=1582 mm and l=2682 mm, decreasing from approximately 100 mm to approximately 56 mm. The wall thickness between l=2682 mm and l=3000 mm is approximately 56 mm (i.e., this portion has a substantially constant wall thickness).

In the 1.8 meter CFRP blade root 704 shown in FIG. 7, the wall thickness between l=1282 mm and 1582 mm is also approximately 100 mm (i.e., the transition portion 710 has a substantially constant wall thickness). At l=2682, the wall thickness is approximately 58 mm, following a linear variation between l=1582 mm and l=2682 mm as the wall thickness decreases from approximately 100 mm to approximately 58 mm. The wall thickness between l=2682 mm and l=3000 mm is approximately 56 mm (i.e., this portion has a substantially constant wall thickness).

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A rotor blade for a wind turbine, comprising:
    a flange section comprising a first end configured to connect the rotor blade to a rotor hub, and a second end; and
    an airfoil section extending outward from the second end,
    wherein the first end has a first diameter and the second end has a second diameter such that a ratio of the first diameter to the second diameter is between approximately 0.75 and 1.0;
    wherein joint bolts in the flange section have a fatigue reserve factor in the range of 1.0 to 1.6; and
    wherein the flange section further comprises a carbon reinforced polymer.

2. The rotor blade of claim 1, wherein the flange section further comprises a tapered portion between the first end and the second end.

3. The rotor blade of claim 2, wherein the flange section further comprises a transition portion between the first end and the tapered portion, the transition portion having a constant diameter and wall thickness.

4. The rotor blade of claim 2, wherein the tapered portion has a wall thickness that varies in size linearly along its length.

5. A blade root for a rotor blade for a wind turbine, comprising:
    a first end for connecting to a rotor hub;
    a second end from which an airfoil section of the rotor blade extends outward; and
    a tapered portion between the first end and the second end,
    wherein the first end has a first diameter and the second end has a second diameter such that a ratio of the first diameter to the second diameter is in the range of approximately 0.75 to 1.0,
    wherein joint bolts in the blade root have a fatigue reserve factor in the range of 1.0 to 1.6, and
    wherein the blade root further comprises a carbon reinforced polymer.

6. The blade root of claim 5, wherein the diameter of the first end is in the range of approximately 1.5 to 1.85 meters.

7. The blade root of claim 5, wherein the diameter of the second end is in the range of approximately 1.8 to 2.3 meters.

8. The blade root of claim 5, further comprising a transition portion between the first end and the tapered portion, the transition portion having a substantially constant diameter and wall thickness.

9. The blade root of claim 8, wherein the tapered portion has a wall thickness that diminishes linearly from the transition portion to the second end.

10. The blade root of claim 9, wherein the wall thickness of the transition portion is approximately 100 mm.

11. The blade root of claim 10, wherein the second end has a wall thickness of approximately 56 mm.

* * * * *